United States Patent
Ichikawa (10) Patent No.: US 10,663,136 B2
(45) Date of Patent: May 26, 2020

(54) DRIVE CIRCUIT FOR MOTOR AND VEHICULAR LAMP

(71) Applicant: KOITO MANUFACTURING CO., LTD., Tokyo (JP)

(72) Inventor: Tomoyuki Ichikawa, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/959,887

(22) Filed: Apr. 23, 2018

(65) Prior Publication Data
US 2018/0313509 A1    Nov. 1, 2018

(30) Foreign Application Priority Data

Apr. 26, 2017   (JP) ................. 2017-087335

(51) Int. Cl.
| F21S 41/675 | (2018.01) |
| H02P 29/024 | (2016.01) |
| H02P 27/06  | (2006.01) |
| B60Q 1/14   | (2006.01) |
| F21S 41/14  | (2018.01) |
| F21S 41/16  | (2018.01) |
| F21S 41/32  | (2018.01) |
| F21S 41/25  | (2018.01) |
| B60L 1/14   | (2006.01) |

(Continued)

(52) U.S. Cl.
CPC .............. *F21S 41/675* (2018.01); *B60L 1/14* (2013.01); *B60Q 1/1423* (2013.01); *F21S 41/14* (2018.01); *F21S 41/16* (2018.01); *F21S 41/25* (2018.01); *F21S 41/32* (2018.01); *H02P 6/00* (2013.01); *H02P 27/06* (2013.01); *H02P 29/0241* (2016.02); *B60Q 2300/05* (2013.01); *F21Y 2115/10* (2016.08); *F21Y 2115/30* (2016.08); *H02M 7/5387* (2013.01); *H02P 2201/09* (2013.01)

(58) Field of Classification Search
CPC .......... F21S 41/675; F21S 41/14; F21S 41/25; F21S 41/32; F21S 41/16; B60Q 1/1423; B60Q 2300/05; H02P 29/0241; H02P 27/06; H02P 2201/09; F21Y 2115/10; F21Y 2115/30; H02M 7/5387
See application file for complete search history.

(56) References Cited

U.S. PATENT DOCUMENTS

| 6,577,514 B2* | 6/2003 | Shor ................ H02M 3/07 327/536 |
| 2002/0149988 A1* | 10/2002 | Ishikawa .......... G11C 5/14 365/226 |

(Continued)

FOREIGN PATENT DOCUMENTS

| JP | 2008-205357 A | 9/2008 |
| JP | 2010-006109 A | 1/2010 |
| JP | 2012-224317 A | 11/2012 |

*Primary Examiner* — Raymond R Chai
(74) *Attorney, Agent, or Firm* — Sughrue Mion, PLLC (57) ABSTRACT

A drive circuit for a motor is used in a light scanning vehicular lamp. The drive circuit includes an output stage, a pre-driver that controls the output stage, a clamp circuit that generates intermediate voltage that is limited so as not to exceed given voltage, and a booster circuit that receives the intermediate voltage and supplies internal power-supply voltage higher than the intermediate voltage to a power supply terminal of the pre-driver.

7 Claims, 7 Drawing Sheets

(51) Int. Cl.
*H02P 6/00* (2016.01)
*H02M 7/5387* (2007.01)
*F21Y 115/10* (2016.01)
*F21Y 115/30* (2016.01)

(56) References Cited

U.S. PATENT DOCUMENTS

| | | | |
|---|---|---|---|
| 2004/0085052 A1* | 5/2004 | Itabashi | H02M 1/36 323/282 |
| 2008/0203946 A1 | 8/2008 | Ito et al. | |
| 2010/0026253 A1* | 2/2010 | Wang | H02M 1/32 323/276 |
| 2014/0042325 A1 | 2/2014 | Yamamura | |
| 2014/0266323 A1* | 9/2014 | McIntosh | H02M 1/08 327/109 |
| 2016/0096467 A1* | 4/2016 | Murakami | H05B 33/0815 315/82 |
| 2017/0201584 A1* | 7/2017 | Endo | H04L 67/12 |
| 2018/0034384 A1* | 2/2018 | Imura | H02M 1/08 |

* cited by examiner

DRIVE CIRCUIT FOR MOTOR AND VEHICULAR LAMP

INCORPORATION BY REFERENCE

The disclosure of Japanese Patent Application No. 2017-087335 filed on Apr. 26, 2017 including the specification, drawings and abstract is incorporated herein by reference in its entirety.

BACKGROUND

1. Technical Field

The disclosure relates to a vehicular lamp used for an automobile and so on.

2. Description of Related Art

In general, it is possible to switch a vehicular lamp between a low beam and a high beam. The low beam lights up a close range with given illuminance, and light distribution regulations are specified so as to avoid glare for oncoming and preceding vehicles. The low beam is mainly used while a vehicle is running in an urban area. Meanwhile, the high beam lights up a wide range and distant places ahead of the vehicle with higher illuminance, and is mainly used while the vehicle is running at high speed on roads with less oncoming and preceding vehicles. There is a problem that although the high beam gives a driver better visibility compared to the low beam, it causes glare for other vehicle drivers and pedestrians in front of the vehicle.

In recent years, an adaptive driving beam (ADB) technology has been proposed, which allows dynamic and adaptive control of a light distribution pattern of a high beam based on a surrounding state of a vehicle. The ADB technology detects existence of preceding vehicles, oncoming vehicles, and pedestrians ahead of a vehicle, and reduces light in areas corresponding to those vehicles or pedestrians. Therefore, glare for those vehicles or pedestrians is reduced.

As a system that realizes the ADB function, a shutter system in which an actuator is controlled, a rotary system, an LED array system, and so on are proposed. In the shutter system and the rotary system, although it is possible to continuously change a width of an extinguished area (a shaded area), the number of extinguished areas is limited to one. In the LED array system, although a plurality of extinguished areas may be established, a width of the extinguished area is restricted within an irradiation width of an LED chip, thus causing discreteness.

The applicant proposes a light scanning system as an ADB system that is able to solve these problems (see Japanese Unexamined Patent Application Publication No. 2012-224317 (JP 2012-224317 A), Japanese Unexamined Patent Application Publication No. 2010-6109 (JP 2010-6109 A)). In the light scanning system, light is made incident on a rotating reflector (a blade), the incident light is reflected at an angle corresponding to a rotation position of the reflector, and the reflected light is scanned in front of a vehicle. At the same time, lighting and extinguishing of a light source is changed depending on the rotation position of the reflector. Thus, a desired light distribution pattern is formed ahead of the vehicle.

SUMMARY

In a light scanning system described in JP 2010-6109 A, it is necessary to always rotate the reflector with a stable number of revolutions.

The disclosure provides a technology that stabilizes the number of revolutions of a motor in a light scanning vehicular lamp.

A drive circuit for a motor that used in a light scanning vehicular lamp according to a first aspect of the disclosure, the drive circuit includes an output stage, a pre-driver, a clamp circuit, and a booster circuit. The output stage receives power-supply voltage and supplies drive voltage to the motor. The pre-driver controls the output stage. The clamp circuit receives the power-supply voltage and generates intermediate voltage that is limited so as not to exceed given voltage. The booster circuit receives the intermediate voltage and supplies internal power-supply voltage higher than the intermediate voltage to a power supply terminal of the pre-driver.

Although power-supply voltage from an in-vehicle battery fluctuates largely and is easily influenced by a surge, it is possible to prevent over-voltage from being supplied to the pre-driver by providing the clamp circuit. Thus, an element with low resistance may be selected for the pre-driver.

In the foregoing aspect, the clamp circuit may include a source follower circuit or an emitter follower circuit. Accordingly, it is possible to protect the pre-driver with a small number of parts.

In the foregoing aspect, the clamp circuit may include a linear regulator.

In the foregoing aspect, the booster circuit may be a charge pump.

In the foregoing configuration, the booster circuit may be a voltage doubler charge pump that generates voltage twice as high as the power-supply voltage.

In the foregoing configuration, a voltage supplying circuit may be further included. The voltage supplying circuit is connected so that both the power-supply voltage and output voltage of the booster circuit are supplied to an input side of the voltage supplying circuit. Also, reference voltage in the clamp circuit may be generated in accordance with output voltage of the voltage supplying circuit. Thus, when the power-supply voltage is reduced, it is possible to prevent reduction of the reference voltage and thus the intermediate voltage following the reduction of the power-supply voltage.

In the foregoing configuration, the voltage supplying circuit may include a diode OR circuit.

In the foregoing aspect, the intermediate voltage may be used as a power supply for a sensor that detects a state of the motor. Thus, it is possible to prevent over-voltage from being supplied to the sensor.

A vehicular lamp according to a second aspect of the disclosure includes a motor, a reflector mounted on a rotor of the motor, and the drive circuit according to the first aspect. The drive circuit drives the motor.

Arbitrary combinations of the foregoing components, and substitutions of the components and expressions of the disclosure for each other among methods, devices, and systems are also effective as aspects of the disclosure.

With the foregoing aspects of the disclosure, it is possible to stabilize the number of revolutions of the motor in the light scanning-system vehicular lamp.

BRIEF DESCRIPTION OF THE DRAWINGS

Features, advantages, and technical and industrial significance of exemplary embodiments of the disclosure will be described below with reference to the accompanying drawings, in which like reference signs denote like elements, and wherein.

DETAILED DESCRIPTION OF EMBODIMENTS

Hereinafter, the disclosure is described with reference to the drawings based on a preferred embodiment. The same reference signs are used for the same or equivalent components, members, and treatments shown in the drawings, and duplicated description is avoided as necessary. Further, the embodiment does not limit the disclosure, and is an example only. All the characteristics and their combinations stated in the embodiment are not necessarily essential to the disclosure.

In this specification, a "state where member A is connected with member B" includes not only a case where member A and member B are connected with each other physically directly, but also a case where member A and member B are connected with each other indirectly through another member, where no substantial influence is given to an electrical connection state between member A and member B, or function and effects achieved by coupling of member A and member B are not failed. Similarly, a "state where member C is provided between member A and member B" includes not only a case where member A and member C, or member B and member C are directly connected with each other, but also a case where member A and member C, or member B and member C are connected with each other indirectly through another member, where no substantial influence is given to an electrical connection state between member A and member C, or member B and member C, or function and effects achieved by coupling of member A and member C, or member B and member C are not failed.

Also, in this specification, reference signs used for electric signals such as a voltage signal and a current signal, or circuit elements such as a resistor and a capacitor represent a voltage value and a current value, or a resistance value, and a capacity value, respectively, as necessary.

Figure 1:
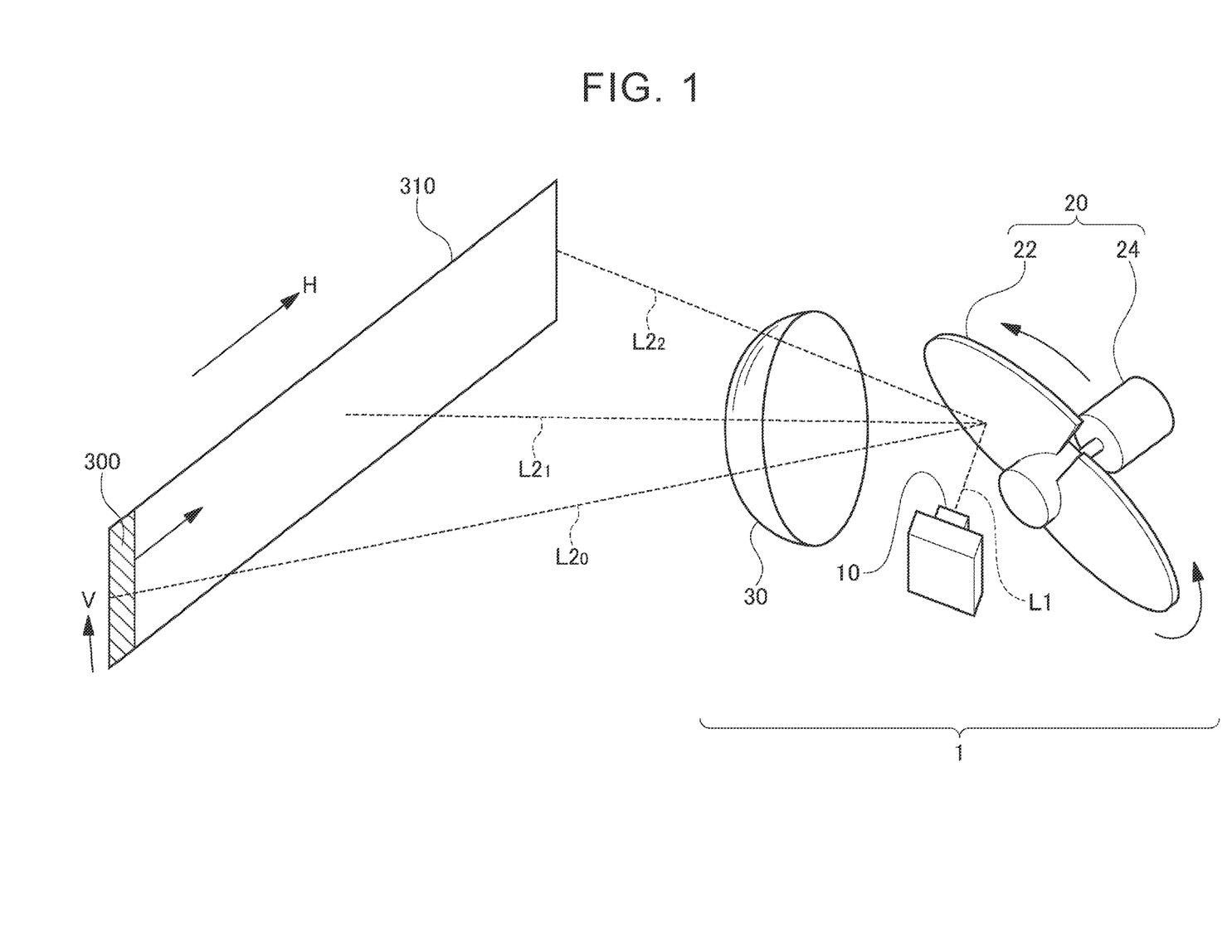
FIG. 1 is a schematic perspective view of a vehicular lamp according to an embodiment.

FIG. 1 is a schematic perspective view of a vehicular lamp 1 according to the embodiment. The vehicular lamp 1 in FIG. 1 is of a light scanning type, and forms various light distribution patterns in front of a vehicle. The vehicular lamp 1 mainly includes a light source 10, a scanning optical system 20, and a projection optical system 30.

The light source 10 includes a high-luminance semiconductor light source such as a light emitting diode (LED) and a laser diode (LD), and its lighting circuit. The scanning optical system 20 reflects emitted light L1 from the light source 10. The projection optical system 30 projects emitted light (that is reflected light) L2 from the scanning optical system 20 to the front. The projection optical system 30 can be made of a lens or a reflector, or a combination of them.

The scanning optical system 20 includes a reflector 22 and a motor 24. The motor 24 is an actuator that changes a position and/or inclination of the reflector 22. In accordance with rotation of the motor 24, the position (or inclination) of the reflector 22 changes periodically, and thus a reflection angle of the light L1 changes. Because of this, the emitted light L2 of the vehicular lamp 1 scans an area in front of the vehicle in a horizontal direction (H direction in the drawing).

At time $t_0$ shown in FIG. 1, the incident light L1 on the reflector 22 is reflected at a reflection angle in accordance with a position of the reflector 22 (a rotation angle of a rotor) at the time, and reflected light $L2_0$ at time $t_0$ forms an irradiation area 300 in front of the vehicle. The irradiation area 300 has given widths in the horizontal direction (H direction) and a vertical direction (V direction), respectively.

At another time $t_1$, the reflection angle changes due to rotation of the reflector 22, and another irradiation area is illuminated. At yet another time $t_2$, the reflector 22 rotates further, and reflected light $L2_2$ at that time illuminates yet another irradiation area. By repeating this operation at high speed, for example, at 50 Hz or higher, the irradiation area 300 is allowed to be scanned in front of the vehicle, thereby forming a light distribution pattern 310.

In a case where the light source 10 has fixed brightness, it is possible to obtain the uniform light distribution pattern 310. When brightness of the emitted light L1 from the light source 10 is changed in synchronization with the scanning of the irradiation area 300, in other words, in synchronization with rotation of the motor 24, the desired light distribution pattern 310 is obtained. For example, when the light source 10 is extinguished in a certain period of time, a zero-illuminance area of the light distribution pattern is formed. By superimposing the zero-illuminance area on oncoming and preceding vehicles, blinding is prevented.

Further, when brightness of the light source 10 is changed in an upward convex form in one scanning period, it is possible to change illuminance distribution continuously. As timing when brightness hits its peak in one scanning period is changed, an electronic swivel function is realized.

The foregoing is a basic configuration of the vehicular lamp 1. Hereinafter, a drive circuit for the motor 24 used for the vehicular lamp 1 is described.

Figure 2:
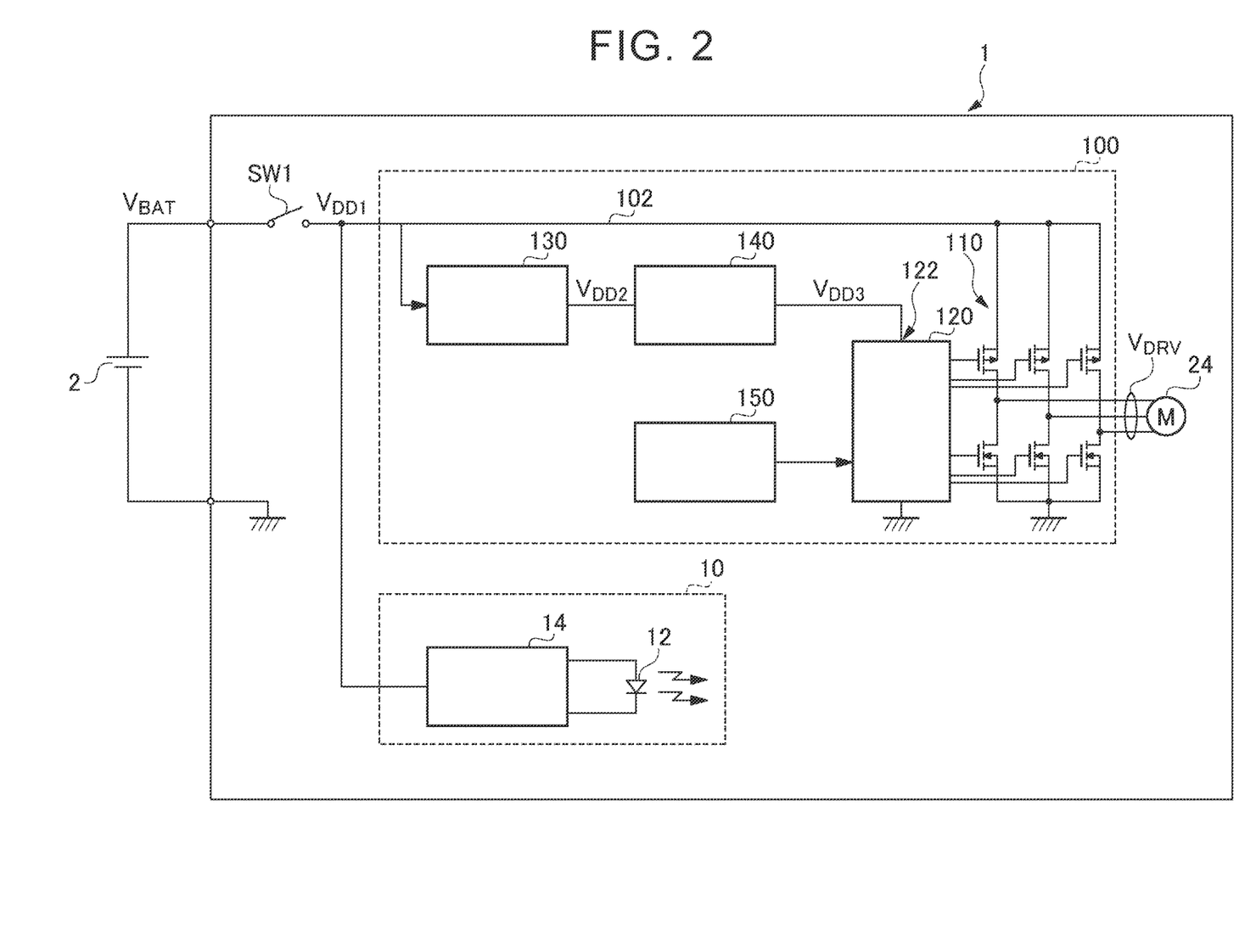
FIG. 2 a circuit diagram of the vehicular lamp according to the embodiment.

FIG. 2 is a circuit diagram of the vehicular lamp 1 according to the embodiment. In FIG. 2, a drive circuit 100 for the motor 24 is shown in detail, and the rest of the blocks are simplified or omitted. In the vehicular lamp 1, direct-current power-supply voltage (battery voltage) $V_{BAT}$ is supplied from an external power supply that is a battery 2. In the vehicular lamp 1, the battery voltage $V_{BAT}$ is used as a power supply and makes circuit blocks inside the vehicular lamp 1 operate. The vehicular lamp 1 includes a switch SW1, the light source 10, the motor 24, and the drive circuit 100 for the motor 24. The switch SW1 is a main electrical switch for the vehicular lamp 1. When the vehicular lamp 1 is turned on, the switch SW1 is turned on, and power-supply voltage $V_{DD1}$ is supplied to the light source 10 and the drive circuit 100.

The light source 10 includes a light emitter 12 and a lighting circuit 14. As described earlier, the light emitter 12 is a high-luminance semiconductor light emitter such as an LED and an LD. The lighting circuit 14 controls brightness of the light emitter 12 in synchronization with rotation of the motor 24, in other words, a position of the reflector mounted on the rotor of the motor 24. Therefore, information indicating a position of the reflector may be input in the lighting circuit 14.

The drive circuit 100 makes the motor 24 rotate with a given number of revolutions. For example, as shown in FIG. 1, when the scanning optical system 20 includes two reflectors 22, and one of the reflectors 22 performs one scanning, then a single rotation of the motor 24 realizes scanning of the irradiation area 300 twice. When a desired scanning frequency is 60 Hz, the motor 24 may be rotated 30 times per second that is 1800 rpm. Thus, the target number of revolutions of the motor 24 is determined based on the shape and number of the reflectors 22, and the number of the light sources 10, so as to obtain a desired scanning frequency.

When the number of revolutions of the motor 24 fluctuates, or rotation of the motor 24 stops, the irradiation area 300 cannot be scanned. Therefore, the drive circuit 100 is required to have very high reliability and stability. On the other hand, although rated voltage of the battery voltage $V_{BAT}$ in a general in-vehicle battery is 12 V (or 24 V), the rated voltage fluctuates very greatly with time, and also changes due to an influence of an instantaneous surge. As a matter of course, the power-supply voltage $V_{DD1}$ inside the vehicular lamp 1 is also influenced by fluctuation of the battery voltage $V_{BAT}$ that serves as an origin. The drive circuit 100 is required to keep the number of revolutions of the motor 24 stable regardless of such fluctuation of the power-supply voltage $V_{DD1}$.

Hereinafter, a configuration of the drive circuit 100 is described. The drive circuit 100 includes an output stage 110, a pre-driver 120, a clamp circuit 130, a booster circuit 140, and a controller 150.

The output stage 110 receives the power-supply voltage $V_{DD1}$ and supplies drive voltage $V_{DRV}$ to the motor 24. In the embodiment, the motor 24 is a three-phase motor, and the output stage 110 is made of a three-phase inverter. However, the motor 24 may be a single-phase motor, and, in this case, the output stage 110 may be made of an H-bridge circuit. Thus, the configuration of the output stage 110 is not limited, and the output stage 110 may be designed in accordance with the number of phases and a drive system of the motor 24. Also, in the embodiment, the output stage 110 is shown as a plurality of field effect transistor (FET), but may also comprise an insulated gate bipolar transistor (IGBT) or a bipolar transistor.

The pre-driver 120 controls the output stage 110. Specifically, the pre-driver 120 is supplied with a control signal $S_{CNT}$ from the controller 150, and supplies a gate driving signal to control terminals (gates or bases) of a plurality of transistors that forms the output stage 110 in accordance with the control signal $S_{CNT}$, thus controlling the transistors on and off.

While the controller 150 is monitoring a state of the motor 24, the controller 150 generates the control signal $S_{CNT}$ so that the motor 24 rotates at a desired number of revolutions. The controller 150 may detect the number of revolutions of the motor 24 and perform feedback control so that the number of revolutions becomes close to a target value. Alternatively, for the number of revolutions, the controller 150 may generate the control signal $S_{CNT}$ through an open loop.

The controller 150 may receive a signal indicating positional information of the rotor from a position-detecting element such as a Hall element, and perform commutation control based on the signal, and current control associated with the commutation control. Alternatively, the controller 150 may estimate the position of the rotor by using a sensorless system based on counter electromotive force of the motor 24, and preform commutation control based on the estimation and current control associated with the commutation control. The configuration and control system of the controller 150 are not particularly limited, and various arts may be used.

The clamp circuit 130 receives the power-supply voltage $V_{DD1}$, and generates intermediate voltage $V_{DD2}$ that is limited so as not to exceed given voltage (referred to as a clamp level $V_{CL}$). The clamp circuit 130 may also be understood as a voltage limiter.

The booster circuit 140 receives the intermediate voltage $V_{DD2}$, and supplies internal power-supply voltage $V_{DD3}$ greater than the intermediate voltage $V_{DD2}$ to a power supply terminal 122 of the pre-driver 120.

The foregoing is the configurations of the drive circuit 100 and the vehicular lamp 1 including the drive circuit 100. Next, operations of the drive circuit 100 and the vehicular lamp 1 are described.

Figure 3:
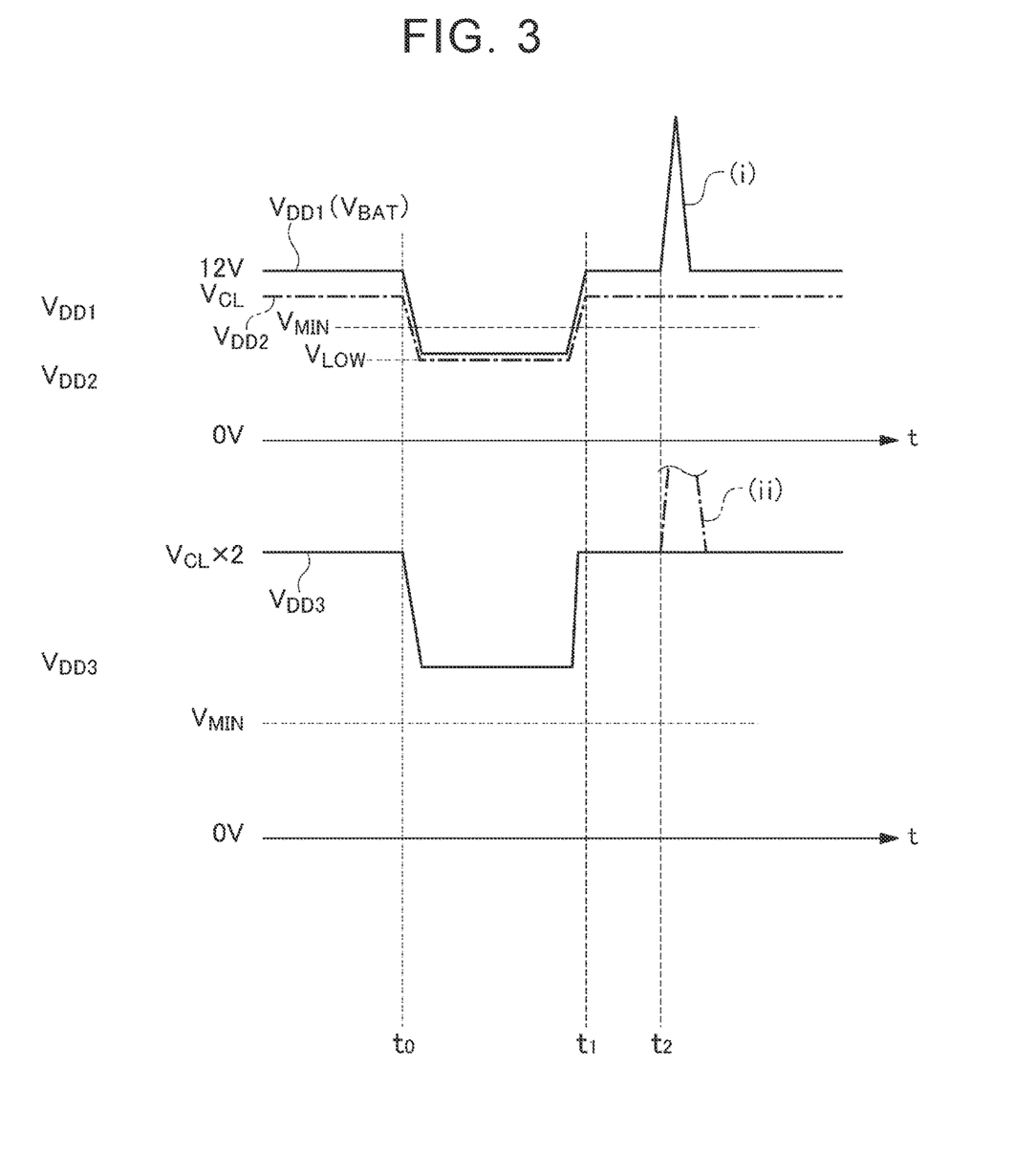
FIG. 3 is an operation waveform chart of the drive circuit shown in FIG. 2.

FIG. 3 is an operation waveform chart of the drive circuit 100 shown in FIG. 2. Here, the booster circuit 140 generates the internal power-supply voltage $V_{DD3}$ that is twice as high as the intermediate voltage $V_{DD2}$.

Prior to time $t_0$, the rated voltage of the power-supply voltage $V_{DD1}$ (the battery voltage $V_{BAT}$) is 12 V. The intermediate voltage $V_{DD2}$ is stabilized in the given clamp level $V_{CL}$. The booster circuit 140 realizes the formula: $V_{DD3}=V_{DD2}\times2=V_{CL2}\times2$.

FIG. 3 shows minimum operating voltage $V_{MIN}$ for the pre-driver 120. The minimum operating voltage $V_{MIN}$ is the lowest voltage for the pre-driver 120. This means that, when voltage at the power supply terminal 122 becomes lower than the minimum operating voltage $V_{MIN}$, the pre-driver 120 cannot drive the output stage 110 normally. Since the internal power-supply voltage $V_{DD3}$ exceeds the minimum operating voltage $V_{MIN}$, it is possible to drive the motor 24 normally before time $t_0$.

At time $t_0$, the power-supply voltage $V_{DD1}$ (battery voltage $V_{BAT}$) becomes a voltage that is lower than the rated voltage of 12 V (a reduced voltage state). The intermediate voltage $V_{DD2}$ is no longer able to maintain the given clamp level $V_{CL}$, and is reduced to the voltage level $V_{Low}$ that is substantially the same as the power-supply voltage $V_{DD1}$. The internal power-supply voltage $V_{DD3}$ at this time is $V_{DD3}=V_{Low}\times2$. In the reduced voltage state, the internal power-supply voltage $V_{DD3}$ is still over the minimum operating voltage $V_{MIN}$, and it is thus possible to drive the motor 24 normally even in a period from time $t_0$ to time $t_1$.

At time $t_1$, the battery voltage $V_{BAT}$ returns to the rated voltage. At time $t_2$, the power-supply voltage $V_{DD1}$ jumps up due to an influence of surge noise, but the clamp circuit 130 maintains the intermediate voltage $V_{DD2}$ at the clamp level $V_{CL}$. Therefore, even when surge noise happens, the power-supply voltage $V_{DD3}$ supplied to the pre-driver 120 does not jump up, and remains at a constant value ($V_{CL}\times2$).

The operations of the drive circuit 100 have been described. Advantages of the drive circuit 100 are clear when compared to comparing technologies described below.

First Comparing Technology

In a first comparing technology, the clamp circuit 130 and the booster circuit 140 are omitted from the drive circuit 100 shown in FIG. 2, and the power-supply voltage $V_{DD1}$ is supplied to the power supply terminal 122 of the pre-driver 120. With this configuration, in the reduced voltage state ($t_0$ to $t_1$) shown in FIG. 3, the voltage $V_{DD1}$ supplied to the power supply terminal 122 becomes lower than the minimum operating voltage $V_{MIN}$. Therefore, it becomes impossible to drive the motor 24 normally.

In order to turn on transistors in a high-side arm of the output stage 110, it is necessary to add a bootstrap circuit in the pre-driver 120 as hardware.

In comparison to this, the drive circuit 100 according to the embodiment is able to prevent the motor 24 from becoming unable to drive in the reduced voltage state. Also, the bootstrap circuit is not necessary.

Second Comparing Technology

In a second comparing technology, the clamp circuit 130 is omitted from the drive circuit 100 shown in FIG. 2, and the power-supply voltage $V_{DD1}$ is supplied directly to the booster circuit 140. With this configuration, in the reduced voltage state ($t_0$ to $t_1$) shown in FIG. 3, it is possible to supply the internal power-supply voltage $V_{DD3}=V_{LOW}\times 2$ exceeding the minimum operating voltage $V_{MIN}$ to the power supply terminal 122 of the pre-driver 120.

However, with the second comparing technology, when surge noise (i) shown in FIG. 3 overlaps the power-supply voltage $V_{DD1}$ (an overvoltage state), a component caused by the surge noise also overlaps the internal power-supply voltage $V_{DD3}$, and the internal power-supply voltage $V_{DD3}$ becomes extremely high (an alternate long and short dash line (ii)). When the internal power-supply voltage $V_{DD3}$ exceeds voltage resistance of elements that configure the pre-driver 120, reliability is reduced remarkably. Therefore, it is necessary to configure the pre-driver 120 with high voltage-resistant elements, thus causing a cost increase.

In comparison to this, in the drive circuit 100 according to the embodiment, the input voltage $V_{DD2}$ for the booster circuit 140 is clamped by the clamp circuit 130 even in the overvoltage state in which the power-supply voltage $V_{DD1}$ increases, and it is thus possible to set an upper limit for the voltage $V_{DD3}$ that is supplied to the power supply terminal 122. Thus, it is possible to configure the pre-driver 120 with low voltage-resistant elements, and costs are thus reduced.

The disclosure extends to various devices and circuits lead by the block diagram and circuit diagrams in FIG. 2, or the foregoing description, and is not limited to specific configuration. Hereinafter, more specific configuration examples and modifications are described not to limit the scope of the disclosure but to facilitate understanding of the essentials of the disclosure and circuit operations and also clarifying them.

Figure 4:
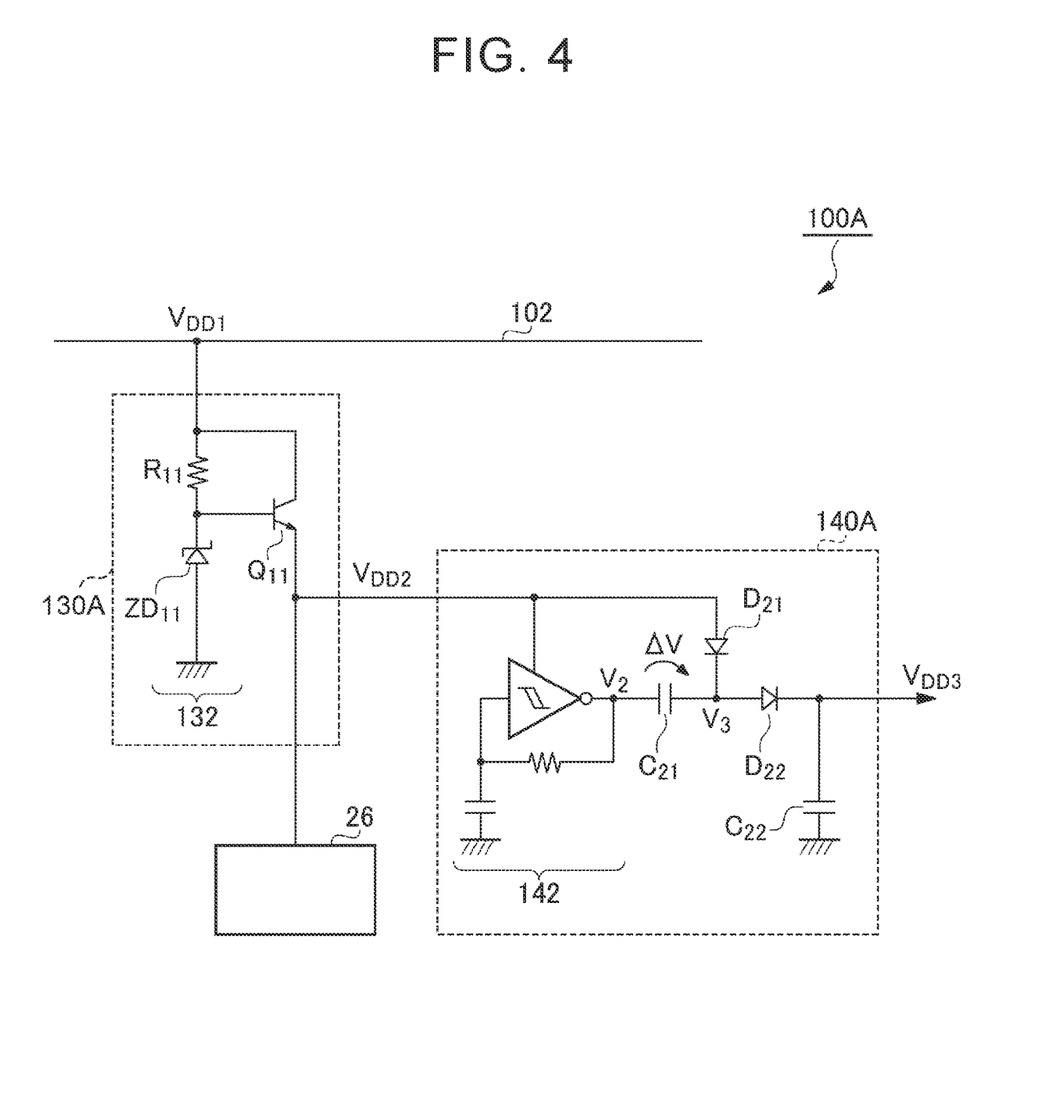
FIG. 4 is a circuit diagram of a part of a drive circuit according to an example.

FIG. 4 is a circuit diagram showing a part of a drive circuit 100A according to an example. A clamp circuit 130A includes a reference voltage circuit 132 that is an emitter follower circuit configured to generate reference voltage $V_{REF}$, and an NPN-type bipolar transistor $Q_{11}$. The reference voltage circuit 132 includes, for example, a resistor $R_{11}$ and a Zener diode $ZD_{11}$ that are provided in series between a power supply line 102 and grounding. The reference voltage $V_{REF}$ is equal to Zener voltage of the Zener diode $ZD_{11}$.

A collector of the bipolar transistor $Q_{11}$ is connected with the power supply line 102, and the reference voltage $V_{REF}$ is applied to a base of the bipolar transistor $Q_{11}$. Voltage of an emitter of the bipolar transistor $Q_{11}$ is the intermediate voltage $V_{DD2}$, and clamped to $V_{CL}=V_{REF}-Vbe$. Vbe is voltage between the base and the emitter of the bipolar transistor. The bipolar transistor $Q_{11}$, may be replaced with an n-channel FET and may be a source follower circuit.

The booster circuit 140A is a voltage-doubler charge pump circuit, and includes an oscillator 142, capacitors $C_{21}$, $C_{22}$, and diodes $D_{21}$, $D_{22}$. The oscillator 142 generates an oscillation signal $V_2$ in which the intermediate voltage $V_{DD2}$ is a high level, and grounding voltage $V_{GND}$ (=0 V) is a low level. When the oscillation signal $V_2$ is in the low level, $\Delta V=V_{DD2}-Vf$ is applied between both ends of the capacitor $C_{21}$, and the capacitor $C_{21}$ is charged. Vf is forward voltage of the diode $D_{21}$. When the oscillation signal $V_2$ is in the high level ($V_{DD2}$), voltage $V_3$ at one end of the capacitor $C_{21}$ becomes $V_3=V_2-\Delta V=2V_{DD2}-Vf$. At this time, the capacitor $C_{22}$ is charged with voltage $V_3-Vf$. By repeating this operation, output voltage $V_{DD3}$ of the booster circuit 140A is given by the following formula: $V_{DD3}=2V_{DD2}-2$ Vf. When 2 Vf is ignored, the internal power-supply voltage $V_{DD3}$ becomes twice as high as the intermediate voltage $V_{DD2}$.

The intermediate voltage $V_{DD2}$ may also be used as a power supply for a sensor 26 that detects a state of a motor (the motor 24 in FIG. 2). Examples of the sensor 26 include a Hall sensor that detects a position of the rotor of the motor 24, and a rotary encoder that detects the number of revolutions of the motor 24.

Figure 5:
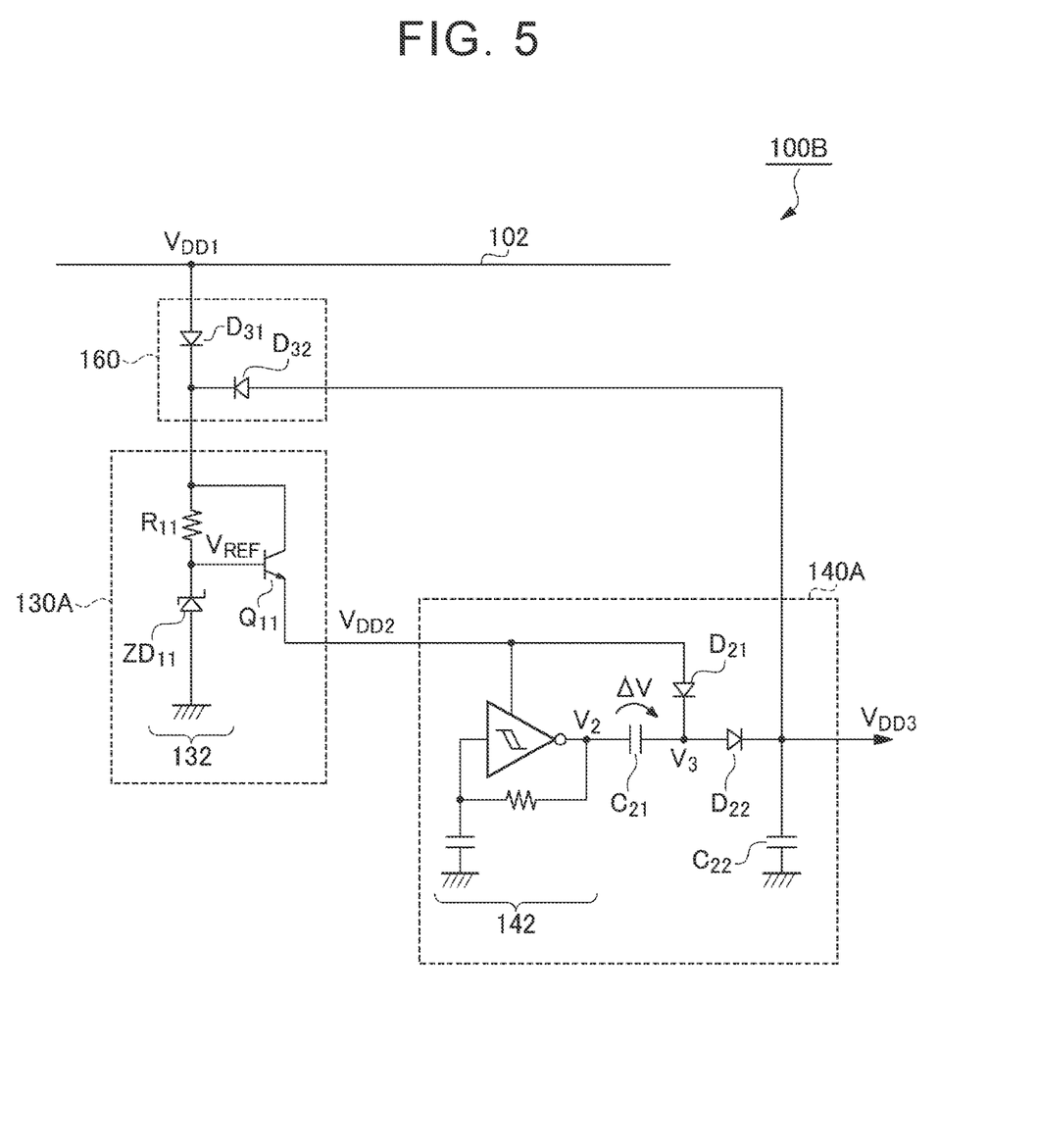
FIG. 5 is a circuit diagram of a part of a drive circuit according to an example.

FIG. 5 is a circuit diagram of a part of a drive circuit 100B according to an example. The drive circuit 100B further includes a voltage supplying circuit 160 in addition to the drive circuit 100A shown in FIG. 4. The voltage supplying circuit 160 is connected so that both the power-supply voltage $V_{DD1}$, and the output voltage $V_{DD3}$ of the booster circuit 140A are supplied to an input side of the voltage supplying circuit 160. For example, the voltage supplying circuit 160 selects the higher of the power-supply voltage $V_{DD1}$, and the output voltage $V_{DD3}$ of the booster circuit 140A. For example, the voltage supplying circuit 160 may be a diode OR circuit that includes diodes $D_{31}$, $D_{32}$ having their cathodes commonly connected. Output voltage $V_{DD4}$ of the voltage supplying circuit 160 is supplied to the reference voltage circuit 132 in the clamp circuit 130A, and reference voltage $V_{REF}$ is generated in accordance with the voltage $V_{DD4}$.

The configuration of the voltage supplying circuit 160 is not limited to the diode OR circuit, and only needs to be a configuration in which output voltage of the booster circuit is represented by an output of the voltage supplying circuit when power-supply voltage is lowered. For example, the voltage supplying circuit 160 may be a selector circuit having two inputs and one output, and may be configured as a combination of a plurality of analog switches.

In the drive circuit 100A shown in FIG. 4, when the power-supply voltage $V_{DD1}$ becomes lower than the Zener voltage $V_{ZD}$, the reference voltage $V_{REF}$ is lowered. As a result, the clamp level $V_{CL}$ and thus the intermediate voltage $V_{DD2}$ are reduced, and the internal power-supply voltage $V_{DD3}$ can become lower than the minimum operating voltage $V_{MIN}$ for the pre-driver 120. On the contrary, in the drive circuit 100B in FIG. 5, after start of the charge pump is completed, once the internal power-supply voltage $V_{DD3}$ is stabilized, $V_{DD3}>V_{DD1}$ is established. Thus, $V_{DD4}(=V_{DD3}-Vf)$ is supplied to the clamp circuit 130A. In this state, even when a reduced voltage state where the $V_{DD1}$ is lowered happens, there is no influence on the clamp circuit 130A. Therefore, it is possible to restrain a reduction of the reference voltage $V_{REF}$ and thus the intermediate voltage $V_{DD2}$. Before start of the charge pump is completed, the power-supply voltage $V_{DD1}$ is given priority and is supplied to the reference voltage circuit 132 and the reference voltage $V_{REF}$ is generated.

The disclosure has been described based on the embodiment. The embodiment is an example only, and it is understood by a person skilled in the art that the combinations of each of the components and processes of processing can be modified variously, and that these modifications are within the scope of the disclosure. Hereinafter, examples of such modifications are described.

First Modification

Figure 6:
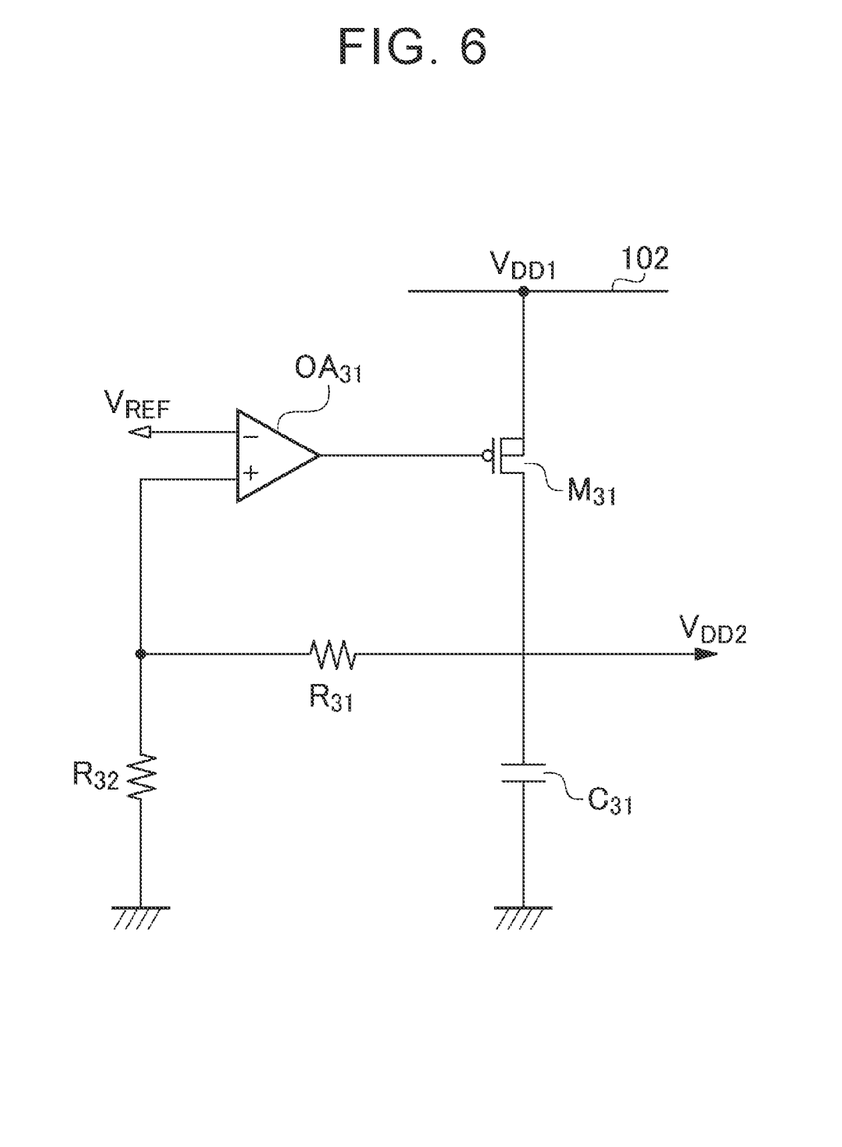
FIG. 6 is a circuit diagram of a clamp circuit according to a modification.

FIG. 6 is a circuit diagram of a clamp circuit 130C according to a modification. The clamp circuit 130C is a linear regulator, and includes an operation amplifier $OA_{31}$, a transistor $M_{31}$, resistors $R_{31}$, $R_{32}$, and a capacitor $C_{31}$. Output voltage $V_{DD2}$ of the clamp circuit 130C is given by the following formula: $V_{DD2}=V_{REF}\times(R_{31}+R_{32})/R_{32}$. By making the capacity of the capacitor $C_{31}$ large, fluctuation of the intermediate voltage $V_{DD2}$ in association with reduced voltage fluctuation of the power-supply voltage $V_{DD1}$ is reduced.

Second Modification

The configuration of the charge pump of the booster circuit 140 is not limited to the one shown in FIGS. 4. 7A to 7C are circuit diagrams of booster circuits 140D, 140E, 140F according to a modification.

Figure 7A:
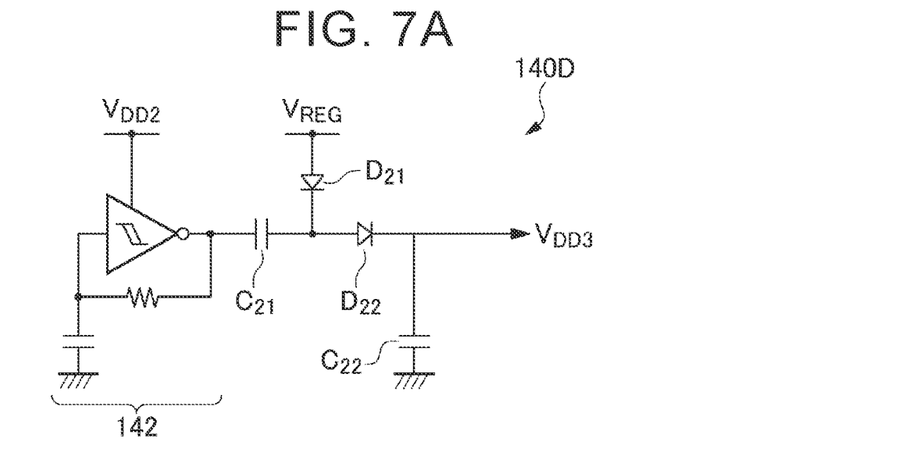
FIG. 7A is a circuit diagram of a booster circuit according to a modification.

The booster circuit 140D shown in FIG. 7A is an adding charge pump, and outputs stabilized voltage $V_{REG}$ and voltage $V_{DD3}$. The stabilized voltage $V_{REG}$ is generated by a power supply circuit (not shown) inside the drive circuit 100, and the voltage $V_{DD3}$ is obtained by adding intermediate voltage $V_{DD2}$ to the stabilized voltage $V_{REG}$. The intermediate voltage $V_{DD2}$ is supplied to a power supply terminal of the oscillator 142, and the stabilized voltage $V_{REG}$ is supplied to an anode of the diode $D_{21}$. According to the configuration, the internal power-supply voltage $V_{DD3}$ expressed by the following formula is generated: $V_{DD3}=V_{REG}+V_{DD2}-2\,Vf$. In a voltage doubler charge pump, when the internal power-supply voltage $V_{DD3}$ is too high, an adding charge pump is used to optimize $V_{REG}$, thus obtaining the internal power-supply voltage $V_{DD3}$ in an adequate voltage level. In FIG. 7A, two voltages $V_{DD2}$, $V_{REG}$ may be replaced with one another.

Figure 7B:
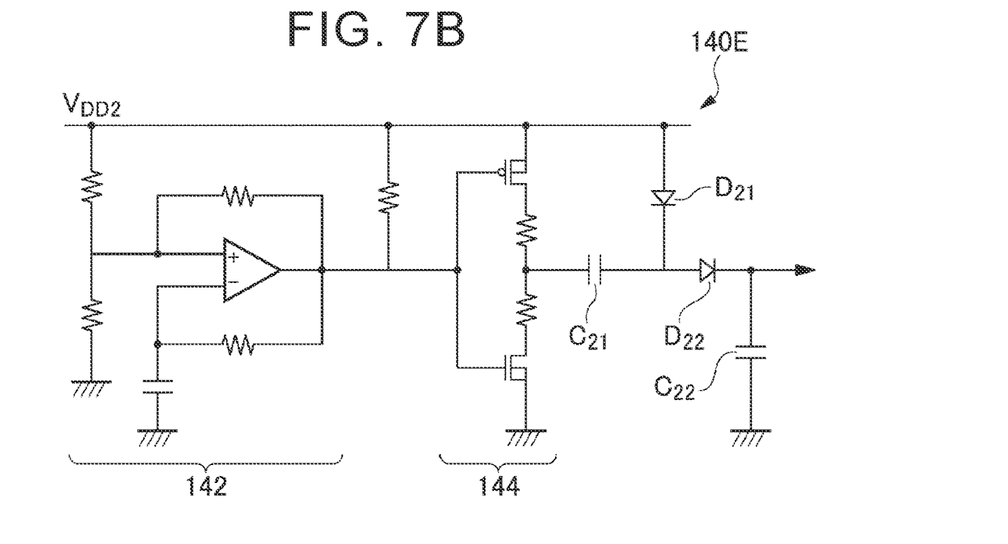
FIG. 7B is a circuit diagram of a booster circuit according to a modification.

In the booster circuit 140E shown in FIG. 7B, a current amplification stage (a buffer stage) 144 is provided in addition to the booster circuit 140A shown in FIG. 5.

Figure 7C:
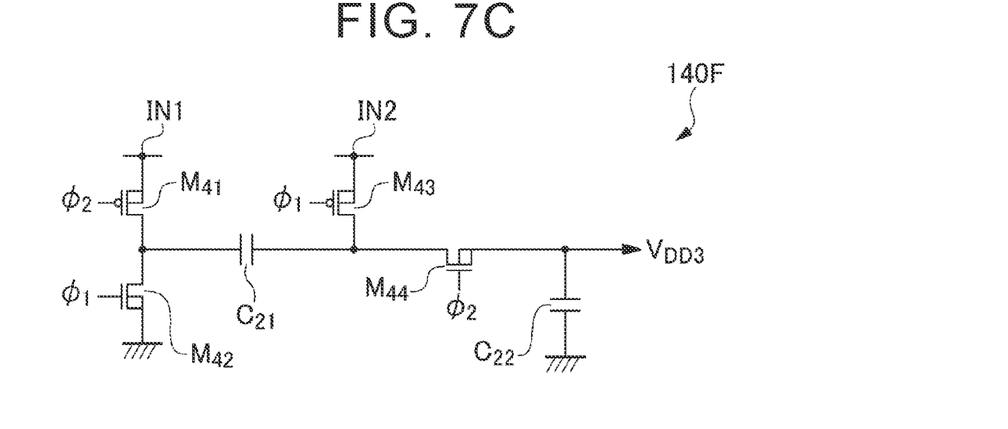
FIG. 7C is a circuit diagram of a booster circuit according to a modification.

The booster circuit 140F shown in FIG. 7C is also a charge pump, and outputs voltage obtained by adding voltage of two input terminals IN1, IN2. When the two input terminals IN1, IN2 are commonly connected, a voltage doubler charge pump is created. The booster circuit 140F includes transistors $M_{41}$, $M_{42}$, $M_{43}$, $M_{44}$ and the capacitors $C_{21}$, $C_{22}$. The transistors $M_{42}$, $M_{43}$ are turned on in a charging phase $\varphi_1$ in which the capacitor $C_{21}$ is charged, and the transistors $M_{41}$, $M_{44}$ are turned on in a transfer phase $\varphi_2$ in which electric charge of the capacitor $C_{21}$ is transferred to the output capacitor $C_{22}$.

The booster circuit 140E shown in FIG. 7B may be transformed to an adding charge pump. In this case, a power supply terminal of the oscillator 142 and the current amplification stage 144 may be a first input IN1, and an anode of the diode $D_{21}$ may be a second input IN2, and different direct-current voltages may be given to the first input IN1 and the second input IN2, respectively.

As the booster circuit 140, a configuration other than the charge pump such as a switching regulator may also be used.

The disclosure has been described based on the embodiment using specific words. However, the embodiment only shows the principle and application of the disclosure, and a number of modifications and changes of arrangement are allowed without departing from the idea of the disclosure defined by the scope of claims.

What is claimed is:

1. A drive circuit for a motor that is used in a light scanning vehicular lamp, the drive circuit comprising:
    an output stage configured to receive power-supply voltage and to supply drive voltage to the motor;
    a pre-driver configured to control the output stage;
    a clamp circuit configured to receive the power-supply voltage and to generate intermediate voltage that is limited so as not to exceed given voltage;
    a booster circuit configured to receive the intermediate voltage and to supply internal power-supply voltage higher than the intermediate voltage to a power supply terminal of the pre-driver; and
    a voltage supplying circuit that is connected so that both the power-supply voltage and output voltage of the booster circuit are supplied to an input side of the voltage supplying circuit;
    wherein the clamp circuit includes a source follower circuit or an emitter follower circuit, and
    wherein reference voltage in the clamp circuit is generated in accordance with output voltage of the voltage supplying circuit.

2. The drive circuit according to claim 1, wherein the clamp circuit includes a linear regulator.

3. The drive circuit according to claim 1, wherein the booster circuit is a charge pump.

4. The drive circuit according to claim 3, wherein the booster circuit is a voltage doubler charge pump configured to generate voltage twice as high as the power-supply voltage.

5. The drive circuit according to claim 1, wherein the voltage supplying circuit includes a diode OR circuit.

6. The drive circuit according to claim 1, wherein the intermediate voltage is used as a power supply for a sensor configured to detect a state of the motor.

7. A vehicular lamp comprising:
    a motor;
    a reflector mounted on a rotor of the motor; and
    the drive circuit of claim 1, the drive circuit being configured to drive the motor.

* * * * *